United States Patent
Gomi et al.

(10) Patent No.: US 6,564,888 B1
(45) Date of Patent: May 20, 2003

(54) BIPED MOBILE ROBOT

(75) Inventors: Hiroshi Gomi; Kazushi Hamaya; Takashi Matsumoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/630,742

(22) Filed: Aug. 2, 2000

(30) Foreign Application Priority Data

Aug. 30, 1999 (JP) .......................................... 11-243448

(51) Int. Cl.$^7$ .............................................. B62D 57/02
(52) U.S. Cl. ............................................. 180/8.6; 901/1
(58) Field of Search ........................ 180/7.1, 8.1, 187, 180/8.6, 8.3, 8.5; 901/1, 28, 46, 15, 50; 305/1, 3, 4; 74/490.01, 490.05; 318/568.12, 568.2, 568.11

(56) References Cited

U.S. PATENT DOCUMENTS

| | | | |
|---|---|---|---|
| 4,776,852 A | * 10/1988 | Rubic | 623/26 |
| 4,862,980 A | * 9/1989 | Shkolnik | 180/8.1 |
| 5,158,493 A | * 10/1992 | Morgrey | 180/8.6 X |
| 5,241,875 A | * 9/1993 | Kochanneck | 901/28 X |
| 5,357,433 A | * 10/1994 | Takenaka et al. | 901/1 X |
| 5,445,235 A | * 8/1995 | Gomi et al. | 180/8.6 |
| 5,758,734 A | * 6/1998 | Hong et al. | 180/8.1 |
| 5,807,011 A | * 9/1998 | Hong et al. | 901/1 X |
| 5,936,367 A | * 8/1999 | Takenaka | 318/568.12 |
| 6,193,002 B1 | * 2/2001 | Paakkunainen | 180/8.1 |

FOREIGN PATENT DOCUMENTS

| | | |
|---|---|---|
| JP | 62-97005 | 5/1987 |
| JP | 2-160482 | 6/1990 |
| JP | 5-62363 | 9/1993 |
| JP | 7-205069 | 8/1995 |
| JP | 11-33941 | 2/1999 |

OTHER PUBLICATIONS

Patent Abstract of Japan—JP 02 160482 A—A Publication Date: Jun. 20, 1990.
Natural Motion Generation of Biped Locomotion Robot Using Hierarchical Trajectory Generation Method Consisting of GA, EP Layers—Arakawa T. et al.—Proceedings of the 1997 IEEE International Conference on Robotics and Automation—vol. 1, conf. 14, Apr. 20, 1997, pp. 211–216.
Fuzzy Control of Dynamic Biped Walking Robot—Murakami S. et al.—1995 IEEE, vol. 1, Mar. 20, 1995—pp. 77–82.
Patent Abstract of Japan—JP 07 0205070 A—Publication date Aug. 8, 1995.

* cited by examiner

Primary Examiner—Robert P. Olszewski
Assistant Examiner—F. Zeender
(74) Attorney, Agent, or Firm—Arent Fox Kintner Plotkin & Kahn, PLLC (57) ABSTRACT

In a biped mobile robot having at least a body and two leg links connected to the body, a parallel linkage is provided between the body and the two leg links such that each of the two leg links are movable relative to the body in a direction of the gravity axis. More specifically, the parallel linkage is composed of upper and lower links and right and left links each connected to the upper and lower links, and the body is connected to the upper and lower links through first and second fulcrums, while the two leg links are each connected to the right and left links. An actuator is provided at the second fulcrum to move the two leg links relative to the body in the gravity axis. Moreover, the body is connected to the parallel linkage through a joint such that the body is movable relative to the two leg links around the gravity axis. With this, the robot can effectively absorb and mitigate footfall impact, offer a high degree of freedom in gait design, thereby enabling rapid, energy-efficient locomotion in a stable attitude, and permit free body movement.

25 Claims, 13 Drawing Sheets

BIPED MOBILE ROBOT

BACKGROUND OF THE INVENTION

1. Field of the Invention

This invention relates to a biped mobile robot.

2. Description of the Related Art

Various technologies relating to biped mobile robots have been proposed, including, for example, those taught by Japanese Laid-open Patent Application Nos. Sho. 62(1987)-97005 and Sho. 62(1988)-97006. Moreover, a review of the prior art shows that various methods have been proposed for effectively absorbing the impact experienced by a biped mobile robot at footfall (touchdown of a foot during biped walking) owing to reaction forces from the ground.

For instance, Japanese Laid-open Patent Application No. Hei. 11(1999)-33941 teaches a technique of absorbing impact at footfall by providing the entire foot with a cushioning member. Among others that have been proposed is that of absorbing the impact at footfall by sharply bending the knee of the free leg when the robot is walking. Still another is that of Japanese Laid-open Patent Application No. Hei. 7(1995)-205069, which teaches a technique of canceling the spin force around the supporting leg by driving the arms during robot walking.

However, none of these prior art technologies provide a satisfactory solution. Assuming a robot weighing 130 kg, the impact received at footfall amounts to more than 300 kgf. An impact of this magnitude cannot be sufficiently absorbed by providing the whole foot with a shock-absorbing member. Moreover, if a soft shock-absorbing member of great thickness is used to cope with the strong impact at footfall, the robot becomes unstable when standing upright.

The technique of bringing the foot down with the knee of the free leg sharply bent can absorb strong footfall impact to some degree but is incapable of absorbing the footfall impact that arises during high-speed walking with long strides, because the knee of the free leg cannot be bent during such high-speed walking. Bending the knee of the free leg at every footfall also increases energy consumption.

In the technique of the aforesaid Japanese Laid-open Patent Application No. Hei. 7(1995)-205069 of canceling the spin force around the supporting leg by driving the arms during robot walking, the fact that the differing heights of the right and left feet during walking makes the robot body lean, causing the robot to swing laterally during walking. The robot's posture therefore becomes unstable during high-speed walking. Another problem is that the leaning of the body causes the gyroscope and/or G sensor (accelerometer) mounted on the body's back or head to output false signals that make walking control difficult. The driving of the arms also consumes additional energy.

A practical technology enabling absorption and mitigation of such footfall impact would expand the degree of freedom in robot gait design, enable rapid, energy-efficient locomotion in a stable attitude, and, by permitting free body movements, make it possible for the robot to work in, for example, a kneeling attitude.

SUMMARY OF THE INVENTION

An object of this invention is therefore to provide a biped mobile robot that can effectively absorb and mitigate footfall impact, offer a high degree of freedom in gait design, thereby enabling rapid, energy-efficient locomotion in a stable attitude, and permit free body movement.

For realizing this object, the present invention provides a biped mobile robot having at least a body and two leg links connected to the body; wherein the improvement comprises: a parallel linkage is provided between the body and the two leg links to connect the body to the two leg links such that each of the two leg links are movable relative to the body in a direction of gravity axis.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

A biped mobile robot that is an embodiment of the invention will now be explained with reference to the drawings.

Figure 1:
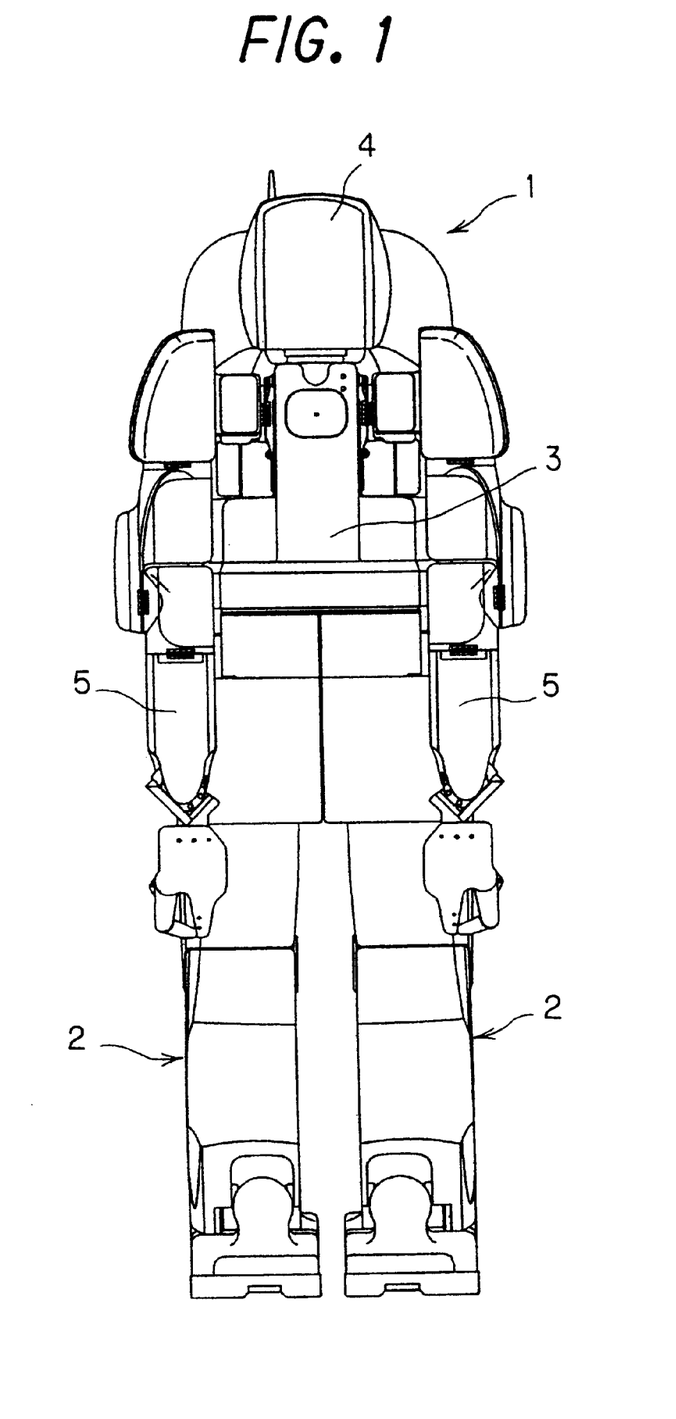
FIG. 1 is a front view of a biped mobile robot according to the invention.
Figure 2:
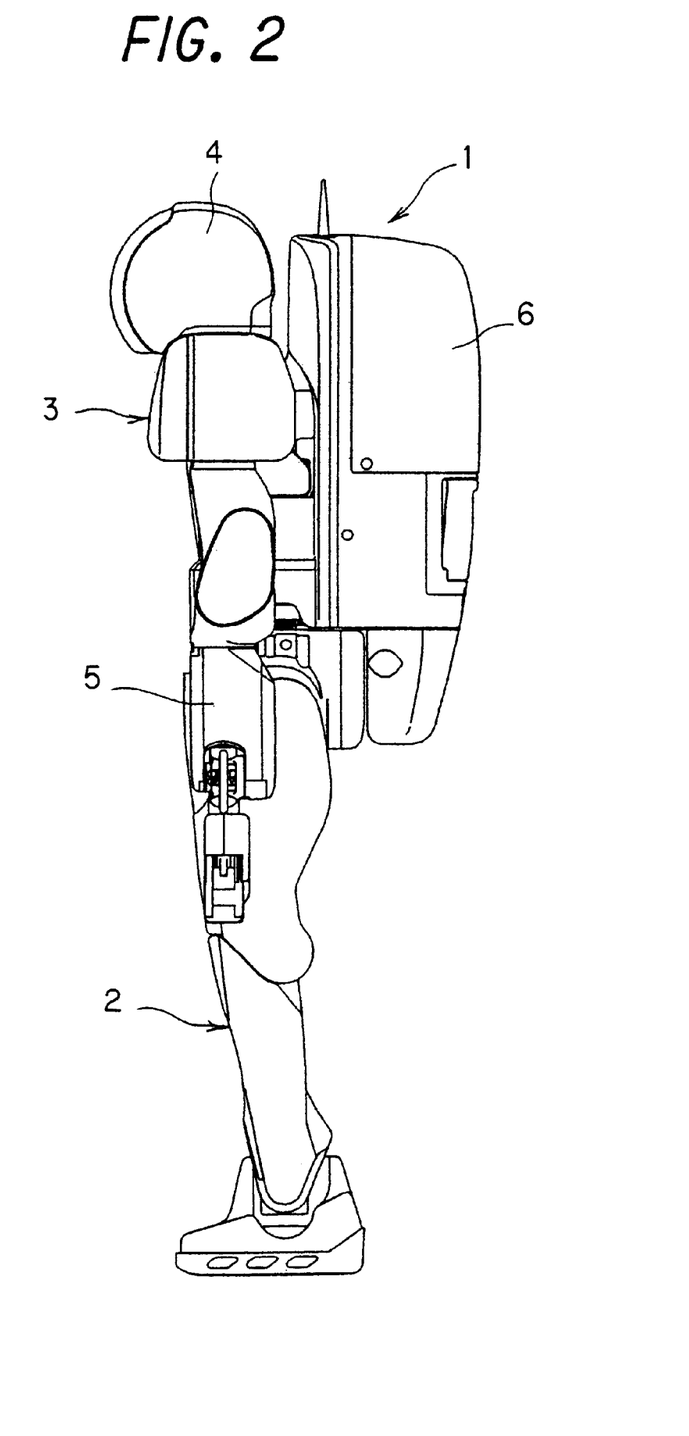
FIG. 2 is a side view of the robot illustrated in FIG. 1.

FIGS. 1 and 2 are front and side views of the biped mobile robot.

As shown in FIG. 1, the biped mobile robot (hereinafter referred to as "robot 1") is equipped with a pair of leg links (articulated legs) 2 and a body 3 located above the leg links 2. A head 4 is formed on the upper end of the body 3 and arm links (articulated arms) 5 are connected to opposite sides of the body 3. As shown in FIG. 2, a housing unit 6 is mounted on the back of the body 3 for accommodating, among other things, a control unit (explained later) and a power supply battery for driving the joints of the robot 1.

The internal structure of the robot 1 will now be explained chiefly with reference to FIG. 3.

As illustrated, the robot I has right and left leg links (legs) 2 each having six joints. (To make the arrangement easier to understand, all of the joints are represented in FIG. 3 as the electric motors by which they are driven.)

The twelve joints are: joints 10R, 10L (R and L indicating the right and left sides) each for swiveling the corresponding leg around the gravity axis (z or vertical axis) of the hip, joints 12R, 12L each for rotation around the roll axis (x axis) of the hip, joints 14R, 14L each for rotation around the pitch axis (y axis) of the hip, joints 16R, 16L each for rotation around the pitch axis (y axis) of the knee, joints 18R, 18L each for rotation around the pitch axis (y axis) of the ankle, and joints 20R, 20L each for rotation around the roll axis (x axis) of the ankle. Feet (foot members) 22R, 22L are attached at the lower ends of the leg links 2.

Thus each leg link 2 comprises the hip (crotch) joints 10R(L), 12R(L) and 14R(L), knee joint 16R(L) and ankle joints 18R(L) and 20R(L). The hip and knee joints are connected by a thigh link 24R(L) and the knee and ankle joints by a shank (crus) link 26R(L). The leg links 2 are connected through the hip joints to the body 3, which is represented in FIG. 3 simply by a body link 28. The arm links 5 are connected to the body 3, as already mentioned.

The arm links 5 comprise joints 30R, 30L each for rotation around the pitch axis of the corresponding shoulder, joints 32R, 32L each for rotation around the roll axis of the shoulder, joints 34R, 34L each for swiveling of the arm around the gravity axis, joints 36R, 36L each for rotation around the pitch axis of the elbow, joints 38R, 38L each for swiveling of the wrist around the gravity axis, joints 40R, 40L each for rotation of the wrist around the pitch axis, and joints 42R, 42L each for rotation of the wrist around the roll axis. Hands (end effectors) 44R, 44L are attached to the distal ends of the wrists.

Thus each arm link 5 comprises the shoulder joints 30R(L), 32R(L) and 34R(L), and the wrist joints 38R(L), 40R(L) and 42R(L). The shoulder joint and the elbow joint are connected by an arm link 46R(L) and the elbow joint and the wrist joint are connected by a forearm link 48R(L).

Owing to the foregoing configuration, the leg links 2 of the right and left legs thus have twelve degrees of freedom in total, so that during locomotion the legs as a whole can be caused to execute the desired movements by driving the 6*2=12 joints to appropriate angles. (The symbol * indicates multiplication in this specification). The robot is thus capable of walking freely within three-dimensional space. Each arm link 5 has seven degrees of freedom. The robot I can therefore be operated to carry out desired jobs by driving these joints to appropriate angles.

Figure 3:
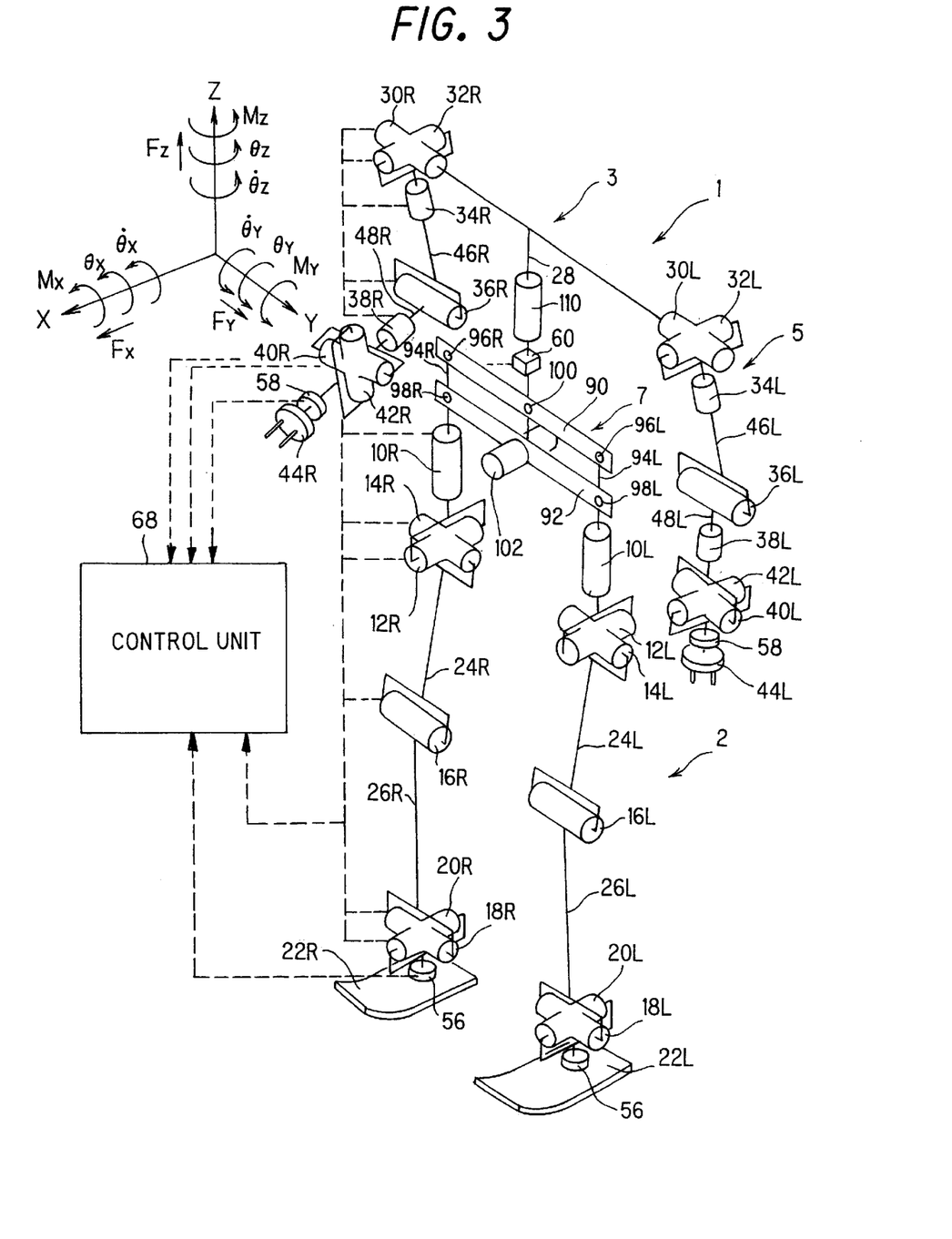
FIG. 3 is a skeleton view of the robot illustrated in FIG. 1 showing the internal structure of the robot.

As shown in FIG. 3, a force sensor 56 of conventional design is mounted on the feet 22R(L) below the ankle joint. Of the external forces acting on the robot, the force sensor 56 detects the three floor reaction force components Fx, Fy and Fz and the three moment components Mx, My and Mz acting on the robot in and around three mutually orthogonal axes from the surface of contact.

Further, a similar force sensor 58 is mounted between the wrist joint and the hand 44R(L). The force sensor 56 detects other forces acting on the robot, particularly the three object reaction force components Fx, Fy and Fz and the three moment components Mx, My and Mz acting on the robot in and around three mutually orthogonal axes from the work (object the robot is performing an operation on).

An inclination sensor 60 mounted on the body 3 detects inclination and angular velocity of the robot 1, more specifically the body 3 relative to the gravity axis. The outputs of the joint motors are geared down through reduction gears (not shown) and applied for moving the links 24R(L), 26R(L) etc. relative to one another. Each motor is provided with an encoder (not shown) for detecting the amount of motor rotation.

The control unit (designated by reference numeral 68) accommodated in the housing unit 6 as mentioned earlier has a microcomputer. The outputs of the force sensors 56 etc. are forwarded to the control unit 68. (For simplicity of illustration, only the outputs from the right side of the robot 1 are indicated in FIG. 3.)

Figure 4:
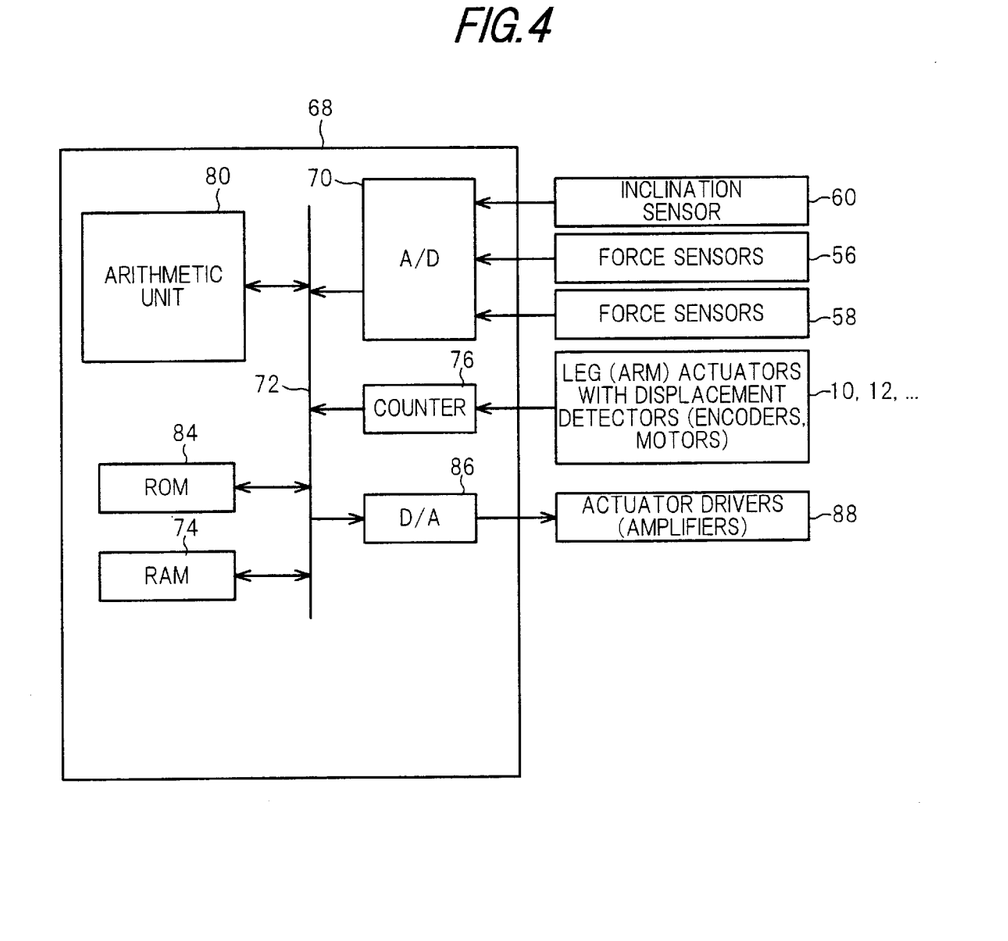
FIG. 4 is a block diagram showing the details of a control unit illustrated in FIG. 1.

Details of the control unit 68 configuration are shown in the block diagram of FIG. 4.

The control unit 68, as stated previously has a microcomputer. The outputs from the inclination sensor 60 etc. are converted into digital signals by an A/D converter 70 and the resulting digital values are sent via a bus 72 to a RAM (random access memory) 74. The outputs of encoders disposed adjacent to the respective motors are input to the RAM 74 through a counter 76.

The control unit 68 has an arithmetic unit (central processing unit) 80. Based on data stored in a ROM (read-only memory) 84 and the sensor outputs, the arithmetic unit 80 computes the manipulated variables (control inputs) needed for driving the joints. It outputs the computed control inputs to the motors for driving the joints through a D/A converter 86 and actuator drivers (amplifiers) 88 provided at the individual joints.

What characterizes the robot 1 of this embodiment is that the body 3 and the two leg links (movable legs) 2 are connected through a parallel linkage 7, so that the leg links 2 are movable relative to each other in the direction of the gravity axis (z axis).

More specifically, the body 3 is connected to upper and lower links of the parallel linkage 7 at first and second fulcrums (supporting points), the right and left leg links 2 are connected to upper and lower links, and an actuator for moving the leg links 2 relative to the gravity axis direction is provided at one or the other of the first and second fulcrums (supporting points).

Further, the body 3 and the upper and lower links are connected through a joint so that the body 3 can be rotated around the gravity axis (z axis) relative to the parallel linkage 7.

The structure of the parallel linkage 7 and associated members will now be explicitly explained with reference to FIG. 5 to FIG. 11.

Figure 5:
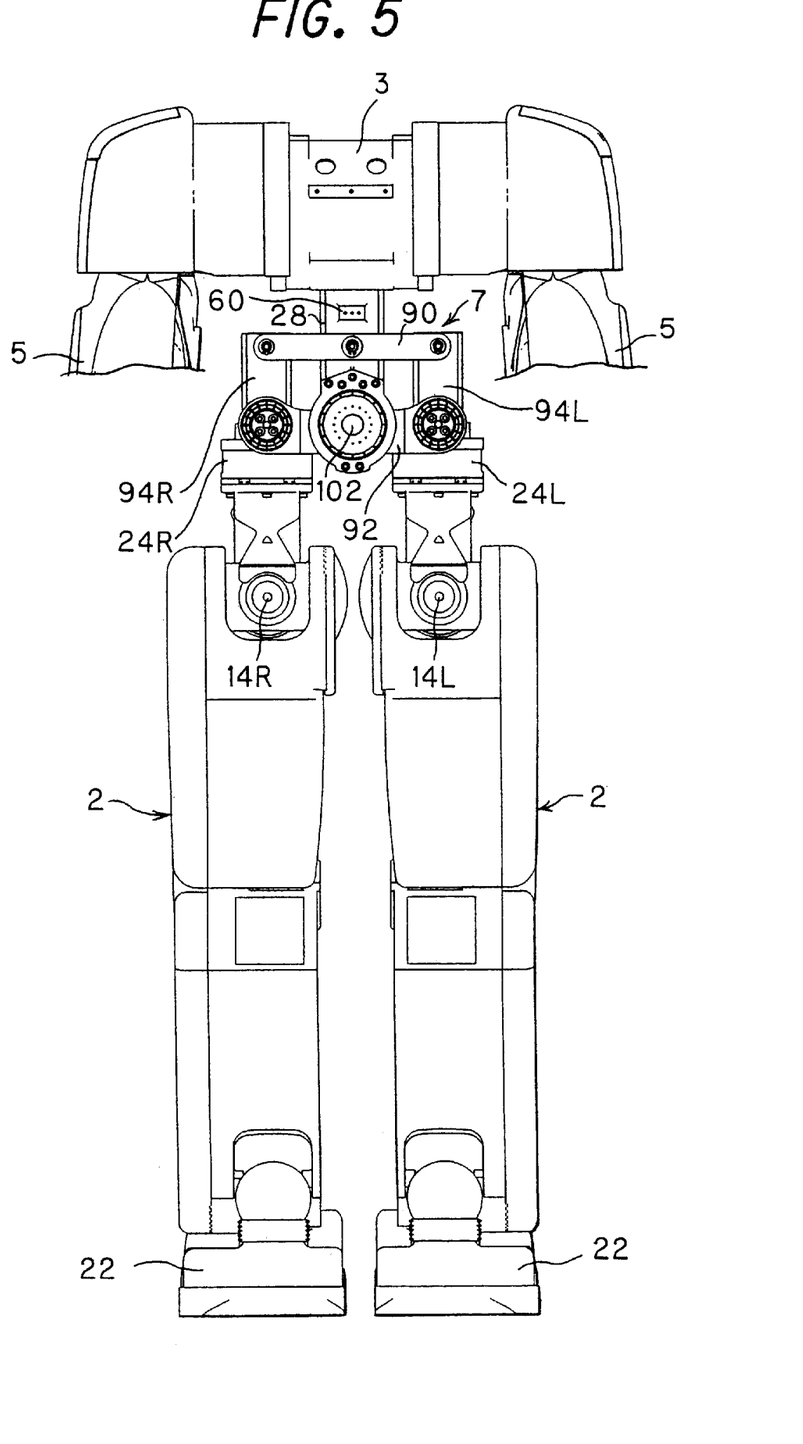
FIG. 5 is a front view, partially in section, of the robot illustrated in FIG. 1 giving a partially broken-away view of a parallel linkage 7.
Figure 6:
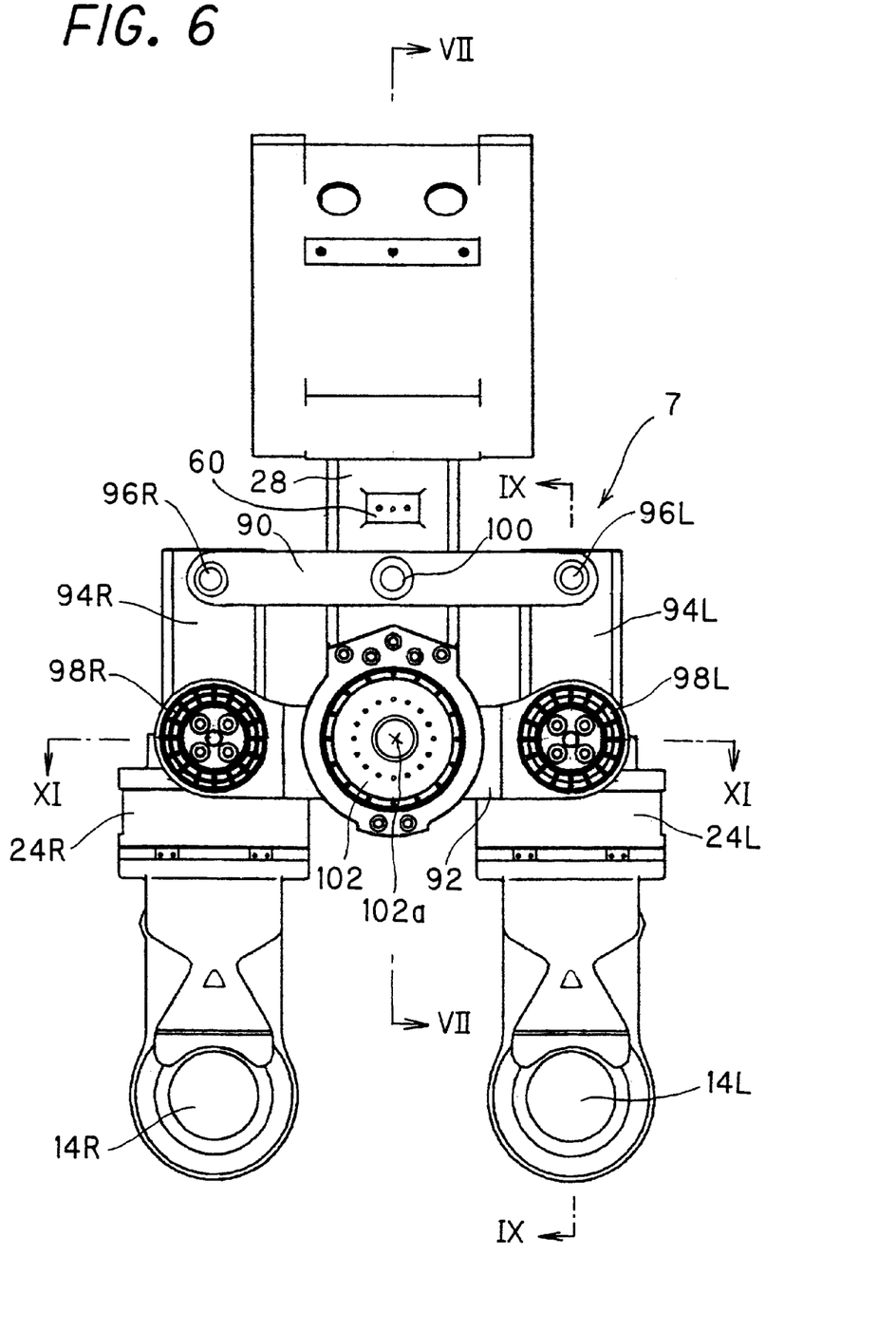
FIG. 6 is a front view of the parallel linkage 7 illustrated in FIG. 5.
Figure 7:
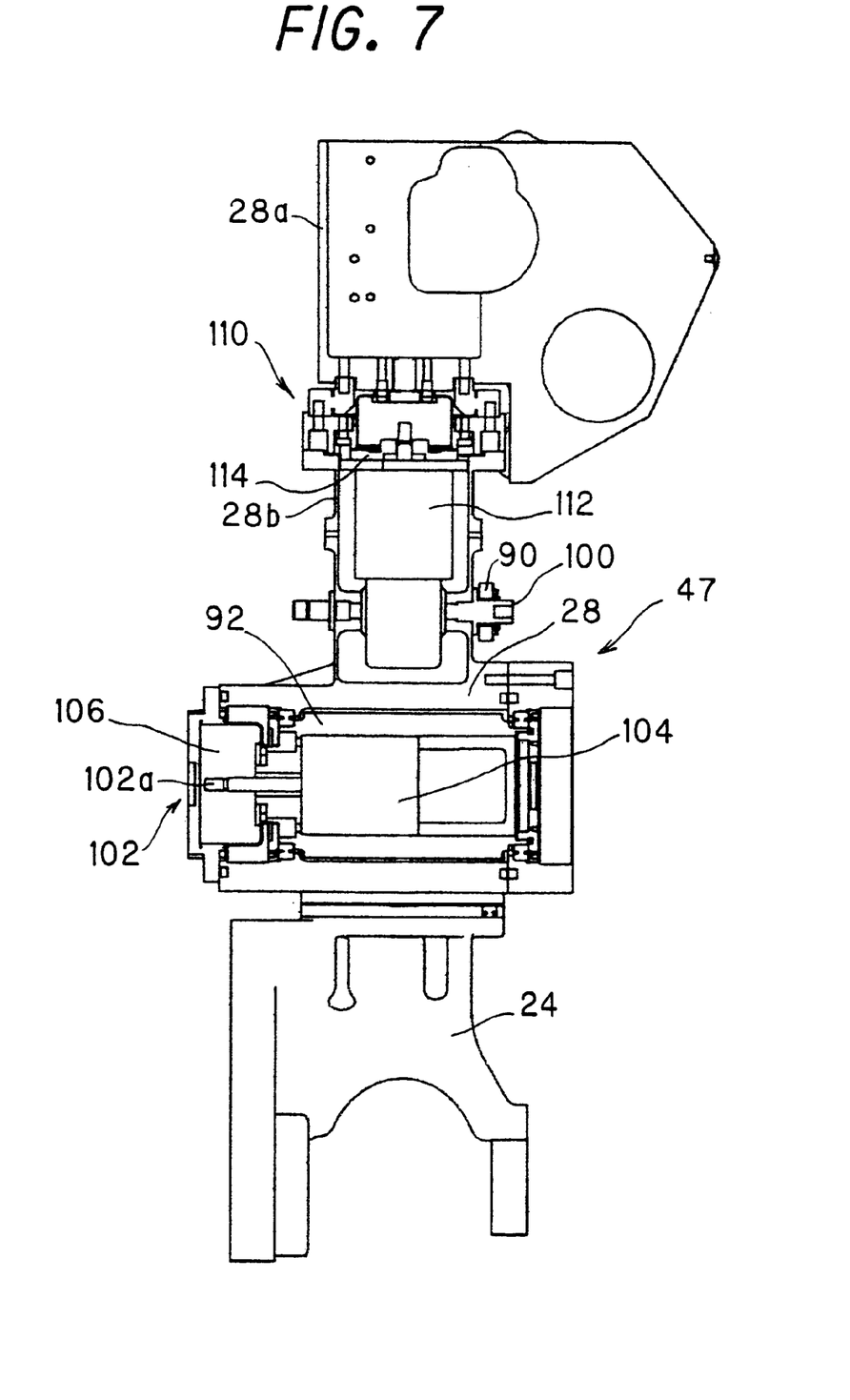
FIG. 7 is a sectional view taken along line VII—VII of FIG. 6.
Figure 8:
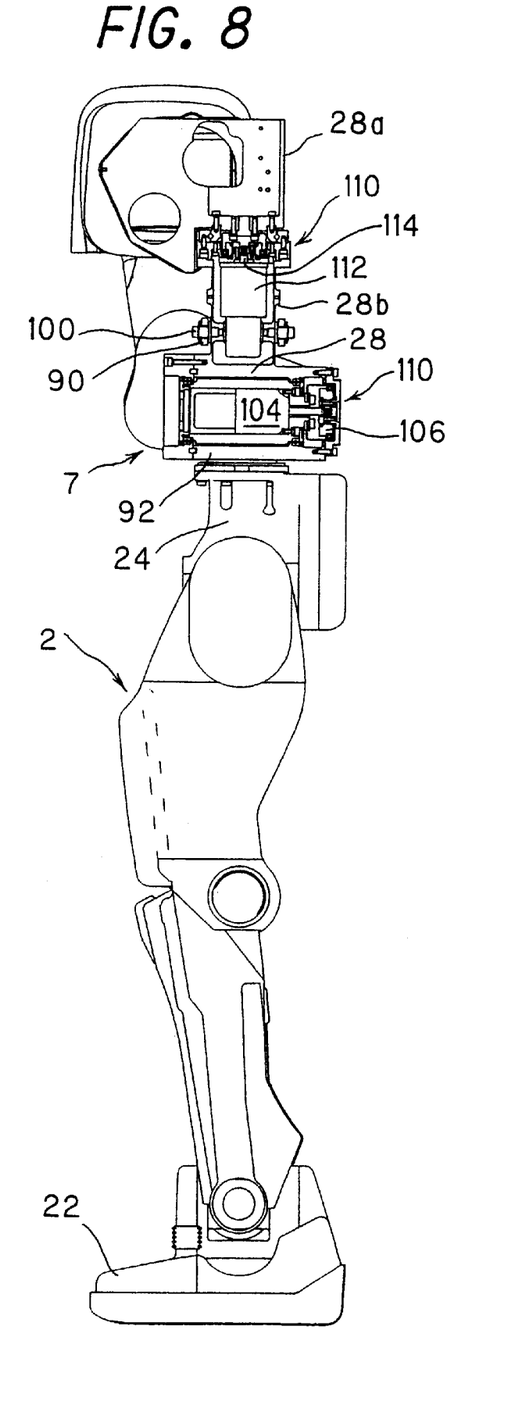
FIG. 8 is a side view, partially in section, of the robot showing the connection between the parallel linkage illustrated in FIG. 7 and a robot body in reverse orientation from that in FIG. 7.
Figure 9:
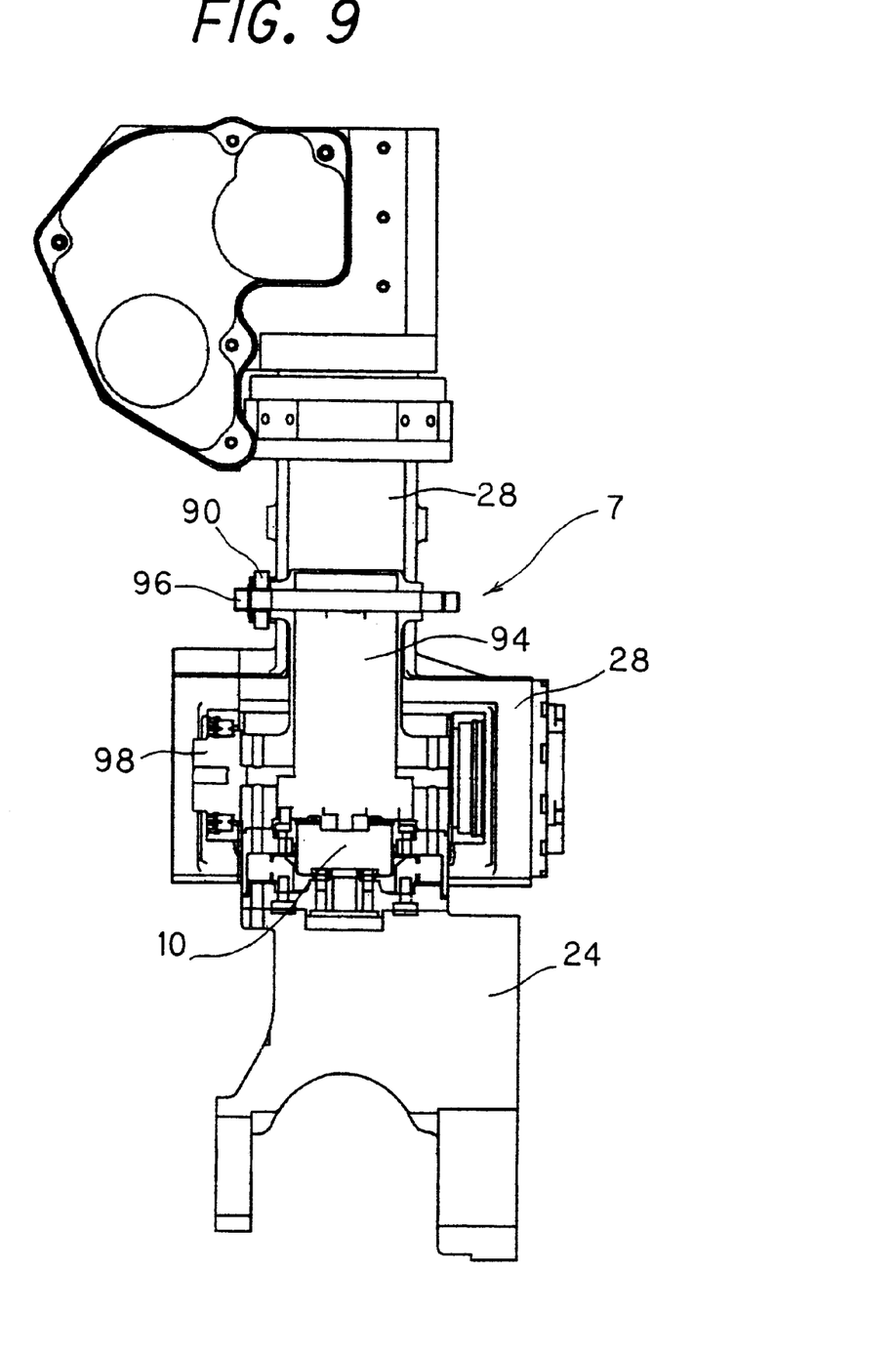
FIG. 9 is a sectional view taken along line IX—IX in FIG. 6.
Figure 10:
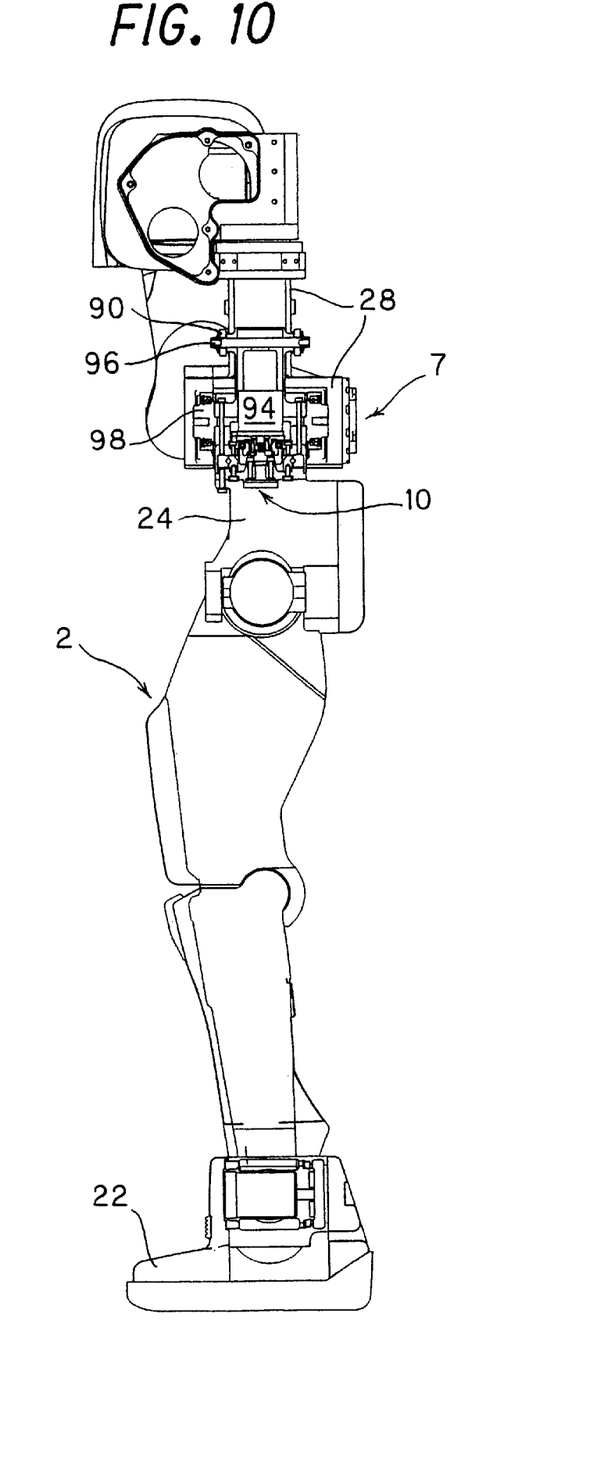
FIG. 10 is a side view, partially in section, of the robot illustrated in FIG. 5 showing the connection between the parallel linkage illustrated in FIG. 9 and the robot body in reverse orientation from that in FIG. 9.
Figure 11:
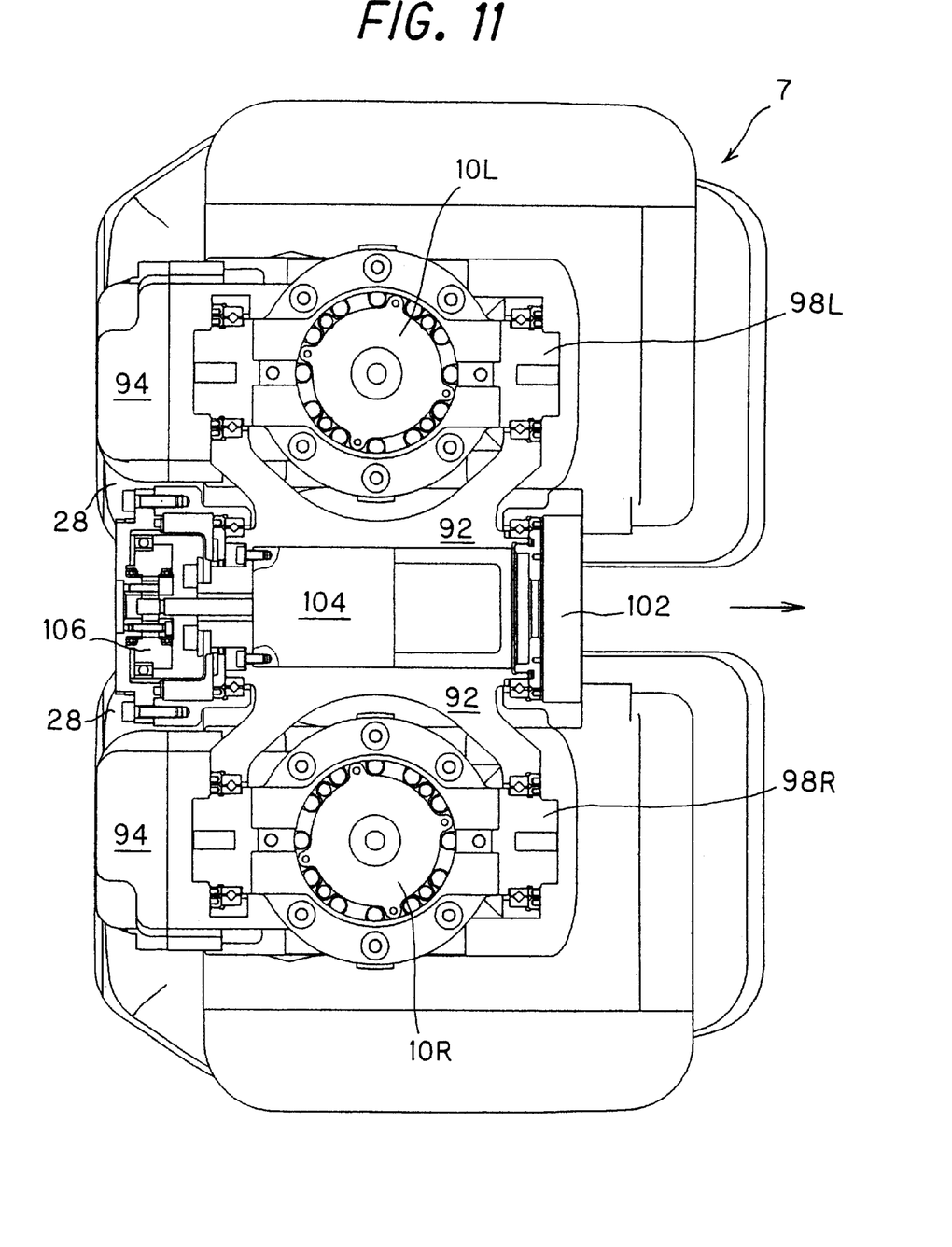
FIG. 11 is a sectional view taken along line XI—XI of FIG. 6, wherein the arrow indicates the direction of robot advance (x axis direction)

FIG. 5 is a front view, partially in section, of the robot 1 of FIG. 1 giving a partially broken-away view of the parallel linkage 7. FIG. 6 is a front view of the parallel linkage 7 in FIG. 5. FIG. 7 is a sectional view taken along line VII—VII of FIG. 6. FIG. 8 is a side view, partially in section, of the robot of FIG. 5 showing the connection between the parallel linkage 7 illustrated in FIG. 7 and the body 3 in reverse orientation from that in FIG. 7. FIG. 9 is a sectional view taken along line IX—IX in FIG. 6. FIG. 10 is a side view, partially in section, of the robot of FIG. 5 showing the connection between the parallel linkage 7 and the body 3 in FIG. 9 in reverse orientation from that in FIG. 9. FIG. 11 is a sectional view taken along line XI—XI of FIG. 6, wherein the arrow indicates the direction of robot advance (x axis direction).

As illustrated, the parallel linkage 7 is composed of upper and lower links, i.e. an upper link 90 and a lower link 92 located at higher and lower positions on the gravity axis (z axis), and right and left links, i.e., a right link 94R and a left link 94L oriented parallel to the gravity axis (z axis) when the robot 1 stands upright.

The upper link 90 and the right and left links 94R, L are connected through rotation shafts 96R, L to be mutually rotatable around the roll axis (x axis). Similarly, the lower link 92 and the right and left links 94R, L are connected through rotation shafts 98R, 98L to be mutually rotatable around the roll axis (x axis).

A rotation shaft (first fulcrum or supporting point) 100 is provided at the center of the upper link 90 (more precisely at the center of the upper link portion between the rotation shafts 96R, L) and the upper link 90 is connected to the body link 28 to be rotatable around the roll axis (x axis). A joint (second fulcrum or supporting point) 102 is provided at the center of the lower link 92 (more precisely at the center of the lower link portion between the rotation shafts 98R, L) and the lower link 92 is connected to the body link 28 to be rotatable around the roll axis (x axis).

The joint 102 will be explained. As shown best in FIGS. 7 and 11, a motor (actuator) 104 is disposed at the joint with its shaft oriented parallel to the roll axis (x axis). The output of the motor 104 is input to a harmonic drive (trademark) reduction mechanism 106. The input of the harmonic drive reduction mechanism 106 is fixed to the body link 28 and the output thereof to the lower link 92, or vice versa.

The lower link 92 is connected to the thigh links 24 of the leg links 2. More specifically, as shown in FIG. 11, each thigh link 24 (not shown) is formed with an empty space in the vicinity of the connection point and the hip joint 10R(L) of the leg link 2 which is housed in this space to be rotatable around the gravity axis (z axis).

When the motor 104 is operated, its output, decreased in angular velocity (increased in torque) by the harmonic drive reduction mechanism 106, rotates the body link 28 (body 3) around the roll axis relative to the lower link 92 (and the leg links 2).

As can be seen in FIGS. 5 and 6, when the robot I stands upright (still), the rotation shafts 96R and 98R fall on the same line in the direction of the gravity axis. The same is true of the rotation shafts 96L, 98L, and also of the rotation shaft 100 and the joint 102 (more precisely, the axis 102 a thereof). Therefore, the motor 104 rotates the body link 28 (body 3) around the roll axis relative to the lower link 92 (and the leg links 2), thereby moving the leg links 2 relative to each other in the gravity axis direction.

This enables effective absorption and mitigation of footfall impact and expands the freedom of gait design. It therefore becomes possible to achieve rapid, energy-efficient locomotion in a stable attitude and, further, to realize free body movement.

Movement also occurs in the pitch axis direction because the right and left rotation shafts 98R, 98L rotate around the joint 102 through the lower link 92. The leg links 2 therefore cannot be moved precisely parallel to the gravity axis with the joint 102 at the center. The movement in the pitch axis direction is, however, negligible because only a slight amount of movement of the leg links in the gravity axis direction is sufficient for absorbing the footfall impact.

Locomotion in a stable attitude is possible, moreover, because the movement of the body link 28 (body 3) produced by the motor 104 is also parallel to the gravity axis. Further, as shown in FIG. 6, the inclination sensor 60 mounted on the body 3 is attached to the body link 28 above the parallel linkage 7. As it is therefore affected only by movement in the direction of the gravity axis, inappropriate control owing to faulty detection can be avoided.

A joint 110 is provided on the body link 28 in the vicinity of the mounting location of the inclination sensor 60. Specifically, as best shown in FIGS. 7 and 8, a motor 112 is installed in the body link 28 with its shaft oriented parallel to the gravity axis. The output of the motor 112 is input to a harmonic drive reduction mechanism 114. The input of the harmonic drive reduction mechanism 114 is fixed to the upper end 28a of the body link 28 and the output thereof to the lower end 28b of the body link 28, or vice versa.

When the motor 112 is operated, its output, decreased in angular velocity (increased in torque) by the harmonic drive reduction mechanism 114, rotates the upper end 28a of the body link 28 around the gravity axis relative to the bottom end 28b of the body link 28 (and the parallel linkage 7 and leg links 2). This enables still free body movements.

The operation of the robot I according to this embodiment will now be explained with reference to FIG. 12.

Figure 12A:
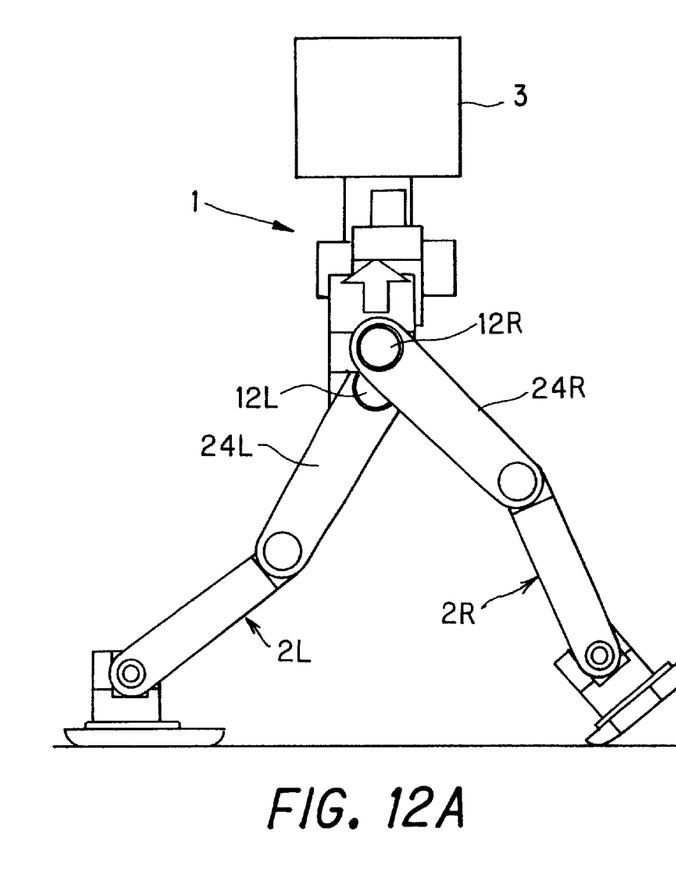
FIGS. 12A and 12B is a set of side and front views of the robot schematically illustrating how the robot is driven to move during walking.
Figure 12B:
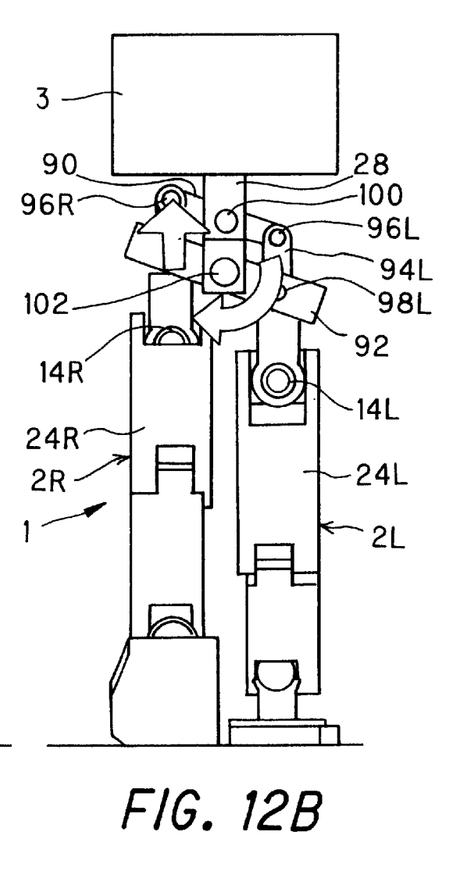

FIGS. 12A and 12B are side and front views schematically illustrating how the robot 1 moves during walking.

As explained earlier, the rotation shaft 100, rotation shaft 96R and rotation shaft 96L are respectively located at positions spaced from the rotation shaft 102, rotation shaft 98R (not shown in the figures) and rotation shaft 98L by equal distances. The rotation shaft 100, rotation shaft 96R and rotation shaft 96L connected by the upper link 90 therefore lie parallel to the lower link 92. Owing to this parallel linkage, the right and left leg links 2 can be moved relative to each other substantially parallel to the gravity axis (z axis) with the joint 102 at the center.

By way of example, FIG. 12A shows the right leg link 2R touching down. At this time, a floor reaction force (footfall impact) acts on the robot 1 via the right leg link 2R. In this embodiment, the motor 104 (not shown) disposed at the joint 102 is operated during this footfall so as to cause the parallel linkage 7 to move the right leg link 2R parallel (substantially parallel) to the left leg link 2L in the direction of the gravity axis, as indicated by the arrow.

More specifically, the motor 104 is operated during footfall to rotate the lower link 92 around the joint 102 to move the alighting leg (right leg link 2R) in the direction of the gravity axis. Since the leg links 2 are connected to the upper link 90, the right leg link 2R making floor contact is moved in the direction of the gravity axis.

In other words, the alighting leg 2R is moved substantially parallel to the supporting leg in contact with the floor (left leg link 2L) by an amount proportional to the output of the motor and in the direction enabling absorption of the large floor reaction force at impact. The floor reaction force can therefore be absorbed in proportion to the amount of movement of the parallel linkage 7, i.e., the amount of movement of the free leg, so that the impact at footfall can be absorbed and mitigated.

Since the parallel linkage 7 ensures that the body 3 does not tilt relative to the gravity axis, the absorption and mitigation of the footfall impact can be achieved while keeping the posture of the robot 1 stable. Any sensor mounted on the body 3 is therefore safe from producing false detection signals and control can therefore be effected without error.

The described configuration expands the degree of freedom in gait design, enables energy-efficient locomotion, and by permitting free body movements, makes it possible for the robot to work in, for example, a kneeling attitude.

The footfall impact acting on the robot 1 of this embodiment will now be explained with reference to FIG. 13.

Figure 13:
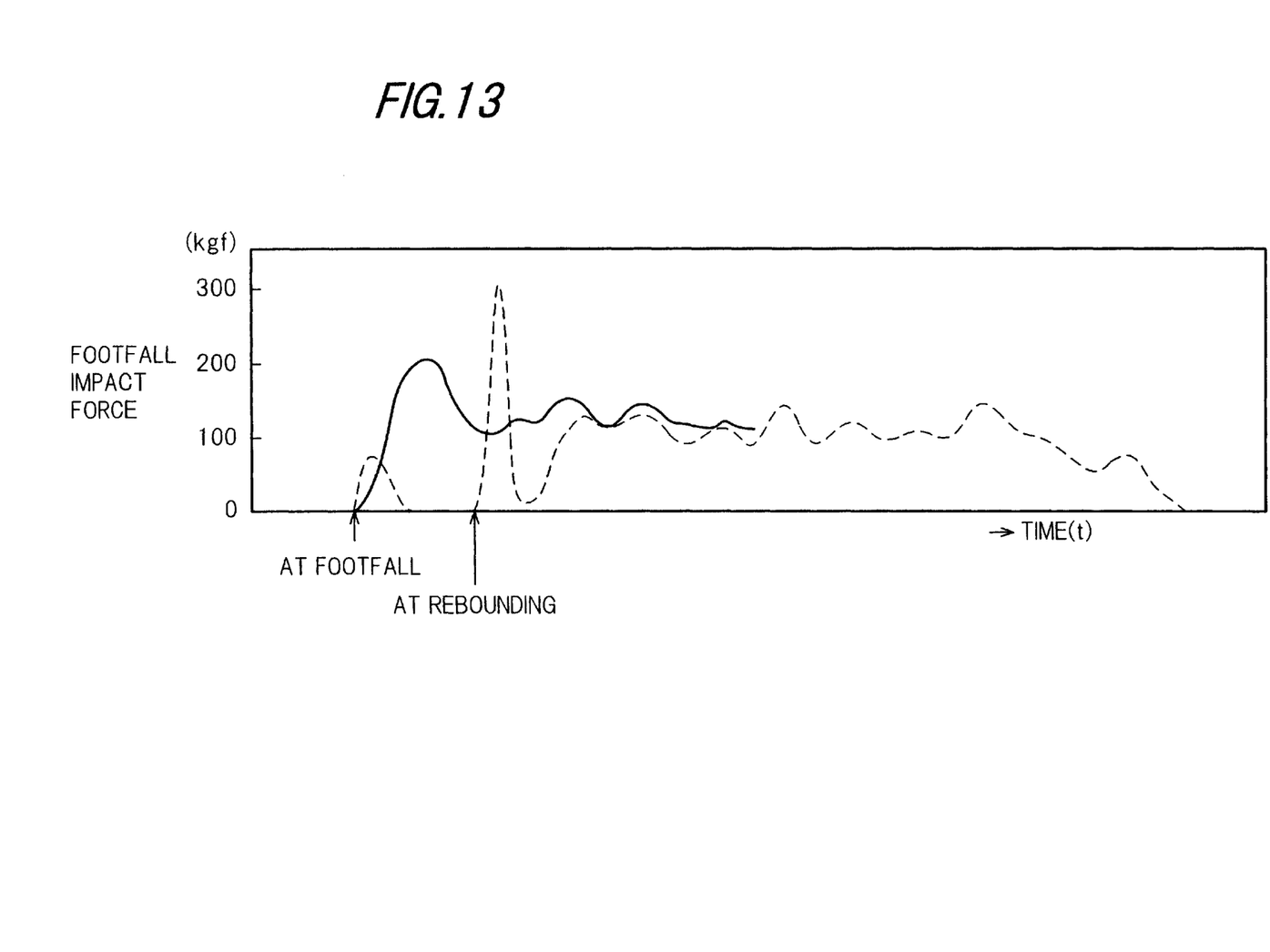
FIG. 13 is a graph illustrating observed data representing the footfall impact (floor reaction force) acting on the robot.

The broken characteristic curve in FIG. 13 was drawn by plotting actually observed data representing the footfall impact (floor reaction force) acting on the robot taught in the assignee's earlier Japanese Laid-open Patent Application No. 11(1999)-33941. The robot used in the test weighed 130 kg. The curve shows that an impact force (floor reaction force) occurred at the instant the free leg touched down, momentarily fell to zero owing to rebound (in the direction of the gravity axis), and then reached approximately 300 kgf when the free leg thereafter collided with the floor.

The solid curve shows the footfall impact pattern of the robot 1 of the aforesaid embodiment. It is a nearly ideal pattern in which the footfall impact (floor reaction force) of approximately 200 kgf at footfall gradually diminished with passage of time. The robot 1 of the embodiment is able to achieve these nearly ideal characteristics because, as explained in the foregoing, the body 3 and the leg links 2 are interconnected via the parallel linkage 7.

Having been configured in the foregoing manner, the embodiment is configured to provide a biped mobile robot (1) having at least a body (3) and two leg links (2) connected to the body; characterized in that a parallel linkage (7) is provided between the body and the two leg links to connect the body to the two leg links such that each of the two leg links are movable relative to the body in a direction of gravity axis (i.e. z-axis).

The biped mobile robot according to the embodiment of the invention can effectively absorb and mitigate footfall impact (floor reaction force), offers a high degree of freedom in gait design, thereby enabling rapid, energy-efficient locomotion in a stable attitude, and permits free body movement.

Moreover, the ability of the robot to maintain a stable attitude during locomotion makes any sensor such as a gyroscope or G sensor mounted on the body safe from producing false detection signals so that inappropriate control can be avoided.

In the biped mobile robot, the parallel linkage is composed of upper and lower links (90, 92) located at higher and lower positions on the gravity axis, and right and left links (94R, 94L) each connected to the upper and lower links and each oriented parallel to the gravity axis when the robot stands upright, and wherein the body (3) is connected to the upper and lower links through a first fulcrum (100) and a second fulcrum (102), while the two leg links (2) are each connected to the right and left links (94R, 94L).

In the biped mobile robot, an actuator (104) is provided at one of the first fulcrum (100) and the second fulcrum (102) to move each of the two leg links (2) relative to the body (3) in the direction of the gravity axis.

In the biped mobile robot, the body (3) is connected to the parallel linkage (7) through a joint (10) such that the body is movable relative to the two leg links around the gravity axis.

In addition to providing the same features and achieving the same effects as the biped mobile robot according to the aspects mentioned above, the biped mobile robot according to this aspect of the invention can further achieve a high degree of freedom of body movement.

In the biped mobile robot, the first fulcrum (100) and the second fulcrum (102) fall on a same line in the direction of the gravity axis when the robot (1) stands upright.

In the biped mobile robot, the right and left links (94R, 94L) are connected to the upper link (90) through a first group of rotation shafts (96R, 96L) and to the lower link (92) through a second group of rotation shafts (98R, 98L), and wherein the first fulcrum (100) is located at a position spaced apart by an equal distance from the first group of rotation shafts (96R, 96L) and the second fulcrum (102) is located at a position spaced apart by an equal distance from the second group of rotation shafts (98R, 98L).

In the biped mobile robot, one (e.g. 94R) of the first group of rotation shafts (94R, 94L) and one (98L) of the second group of rotation shafts (98R, 98L) fall on a same line in the direction of the gravity axis, while another (e.g. 94L) of the first group of rotation shafts (94R, 94L) and another (98L) of the second group of rotation shafts (98R, 98L) fall on the same line in the direction of the gravity axis, when the robot (1) stands upright.

In the biped mobile robot, the first fulcrum is a rotation shaft (100) and the second fulcrum is a joint (102).

The biped mobile robot further includes an inclination sensor (60) for detecting inclination of the robot (1) relative to the gravity axis, and wherein the inclination sensor (60) is mounted on the body (3) above the parallel linkage (7).

It should be noted that, although a parallel linkage is utilized in the described embodiment, the invention is not limited to this structure. For instance, there can instead be adopted a rack-and-pinion mechanism in which the two movable leg members are connected to two racks and the body link is connected to a pinion gear located midway therebetween.

It should also be noted that the explanation regarding a biped mobile robot set out in the foregoing also applies with necessary modifications to legged mobile robots of other than biped locomotion type.

While the invention has thus been shown and described with reference to specific embodiments, it should be noted that the invention is in no way limited to the details of the described arrangements but changes and modifications may be made without departing from the scope of the appended claims.

What is claimed is:

1. A two-legged mobile robot having at least a body and two leg links connected to the body;
   wherein
   the improvement comprises:
   a parallel linkage is provided between the body and the two leg links to connect the body to the two leg links such that each of the two leg links is movable relative to the body in a direction of gravity axis,
   wherein the parallel linkage is composed of upper and lower links located at higher and lower positions on the gravity axis, and right and left links each connected to the upper and lower links and each oriented parallel to the gravity axis when the robot stands upright,
   and wherein the body is connected to the upper and lower links through a first fulcrum and a second fulcrum, while the two leg links are each connected to the right and left links,
   wherein the first fulcrum and the second fulcrum are aligned in the direction of the gravity axis when the robot stands upright, and
   wherein the right and left links are connected to the upper link through a first group of rotation shafts and to go to the lower link through a second group of rotation shafts,
   and wherein the first fulcrum is located at a position spaced apart by an equal distance from the first group of rotation shafts and the second fulcrum is located at a position spaced apart by an equal distance from the second group of rotation shafts.

2. A two-legged mobile robot according to claim 1, wherein an actuator is provided at one of the first fulcrum and the second fulcrum to move each of the two leg links relative to the body in the direction of the gravity axis.

3. A two-legged mobile robot according to claim 1, wherein the body is connected to the parallel linkage through a joint such that the body is movable relative to the two leg links around the gravity axis.

4. A two-legged mobile robot according to claim 1, wherein the body is connected to the parallel linkage through a joint such that the body is movable relative to the two leg links around the gravity axis.

5. A two-legged mobile robot according to claim 2, wherein the body is connected to the parallel linkage through a joint such that the body is movable relative to the two leg links around the gravity axis.

6. A two-legged mobile robot according to claim 1, wherein the first fulcrum is a rotation shaft and the second fulcrum is a joint.

7. A two-legged mobile robot according to claim 1, further including:
   an inclination sensor for detecting inclination of the robot relative to the gravity axis,
   and wherein the inclination sensor is mounted on the body above the parallel linkage.

8. A two-legged mobile robot according to claim 1, wherein one of the first group of rotation shafts and one of the second group of rotation shafts are aligned in the direction of the gravity axis, while another of the first group of rotation shafts and another of the second group of rotation shafts are aligned in the direction of the gravity axis, when the robot stands upright.

9. A two-legged mobile robot having at least a body and two leg links connected to the body;
   wherein the improvement comprises:
   the parallel linkage provided between the body and the two leg links to connect the body to the two leg links such that each of the two leg links is movable relative to the body in a direction of a gravity axis,
   wherein the parallel linkage includes upper and lower links located at higher and lower positions relative to the gravity axis and right and left links each connected to the upper and lower links,
   and wherein the body is connected to the upper and lower links through a first fulcrum and a second fulcrum, while the two leg links are each connected to the right and left links,
   wherein the first fulcrum and the second fulcrum are aligned in the direction of the gravity axis when the robot stands upright, and
   wherein the right and left links are connected to the upper link through a first group of rotation shafts and to the lower link through a second group of rotation shafts,
   and wherein the first fulcrum is located at a position spaced apart by an equal distance from the first group of rotation shafts and the second fulcrum is located at a position spaced apart by an equal distance from the second group of rotation shafts.

10. A two-legged mobile robot according to claim 9, wherein the right and left links are each oriented parallel relative to the gravity axis when the robot stands upright.

11. A two-legged mobile robot according to claim 9, wherein an actuator is provided at one of the first fulcrum and the second fulcrum to move each of the two leg links relative to the body in a direction of the gravity axis.

12. A two-legged mobile robot according to claim 9, wherein the body is connected to the parallel linkage through a joint such that the body is movable relative to the two leg links around the gravity axis.

13. A two-legged mobile robot according to claim 9, wherein the first fulcrum is a rotation shaft and the second fulcrum is a joint.

14. A two-legged mobile robot according to claim 9, further including:
   an inclination sensor for detecting inclination of the robot relative to the gravity axis,
   and wherein the inclination sensor is mounted on the body above the parallel linkage.

15. A two-legged mobile robot having at least a body and two leg links connected to the body;
   wherein the improvement comprises:
   a linkage provided between the body and the two leg links to connect the body to the two leg links such that each of the two leg links is movable relative to the body in a direction of a gravity axis,
   wherein the linkage includes upper and lower links located at higher and lower positions relative to the gravity axis and right and left links each connected to the upper and lower links, and wherein the body is connected to the upper and lower links through a first fulcrum and a second fulcrum, while the two leg links are each connected to the right and left links, wherein the first fulcrum and the second fulcrum are aligned in the direction of the gravity axis when the robot stands upright, and wherein the right and left links are connected to the upper link through a first group of rotation shafts and to the lower link through a second group of rotation shafts, and wherein the first fulcrum is located at a position spaced apart by an equal distance from the first group of rotation shafts and the second fulcrum is located at a position spaced apart by an equal distance from the second group of rotation shafts.

16. A two-legged mobile robot according to claim 15, wherein the linkage is a parallel linkage and the right and left links are each oriented parallel relative to the gravity axis when the robot stands upright.

17. A two-legged mobile robot according to claim 16, wherein an actuator is provided at one of the first fulcrum and the second fulcrum to move each of the two leg links relative to the body in the direction of the gravity axis.

18. A two-legged mobile robot according to claim 16, wherein the body is connected to the parallel linkage through a joint such that the body is movable relative to the two leg links around the gravity axis.

19. A two-legged mobile robot according to claim 15, wherein the first fulcrum is a rotation shaft and the second fulcrum is a joint.

20. A two-legged mobile robot according to claim 15, further including:

an inclination sensor for detecting inclination of the robot relative to the gravity axis, and wherein the inclination sensor is mounted on the body above the linkage.

21. A two-legged mobile robot according to claim 15, wherein the upper and lower links are each oriented oblique relative to the gravity axis when the robot is walking.

22. A two-legged mobile robot according to claim 21, wherein a actuator is provided at one of the first fulcrum and the second fulcrum to move each of the two leg links relative to the body in the direction of the gravity axis.

23. A two-legged mobile robot according to claim 21, wherein the body is connected to the linkage through a joint such that the body is movable relative to the two legged links around the gravity axis.

24. A two-legged mobile robot according to claim 21, wherein the first fulcrum is a rotation shaft and second fulcrum is a joint.

25. A two-legged mobile robot according to claim 21, further including:

an inclination sensor for detecting inclination of the robot relative to the gravity axis, and wherein the inclination sensor is mounted on the body above the linkage.

* * * * *